United States Patent Office 3,334,524
Patented Aug. 8, 1967

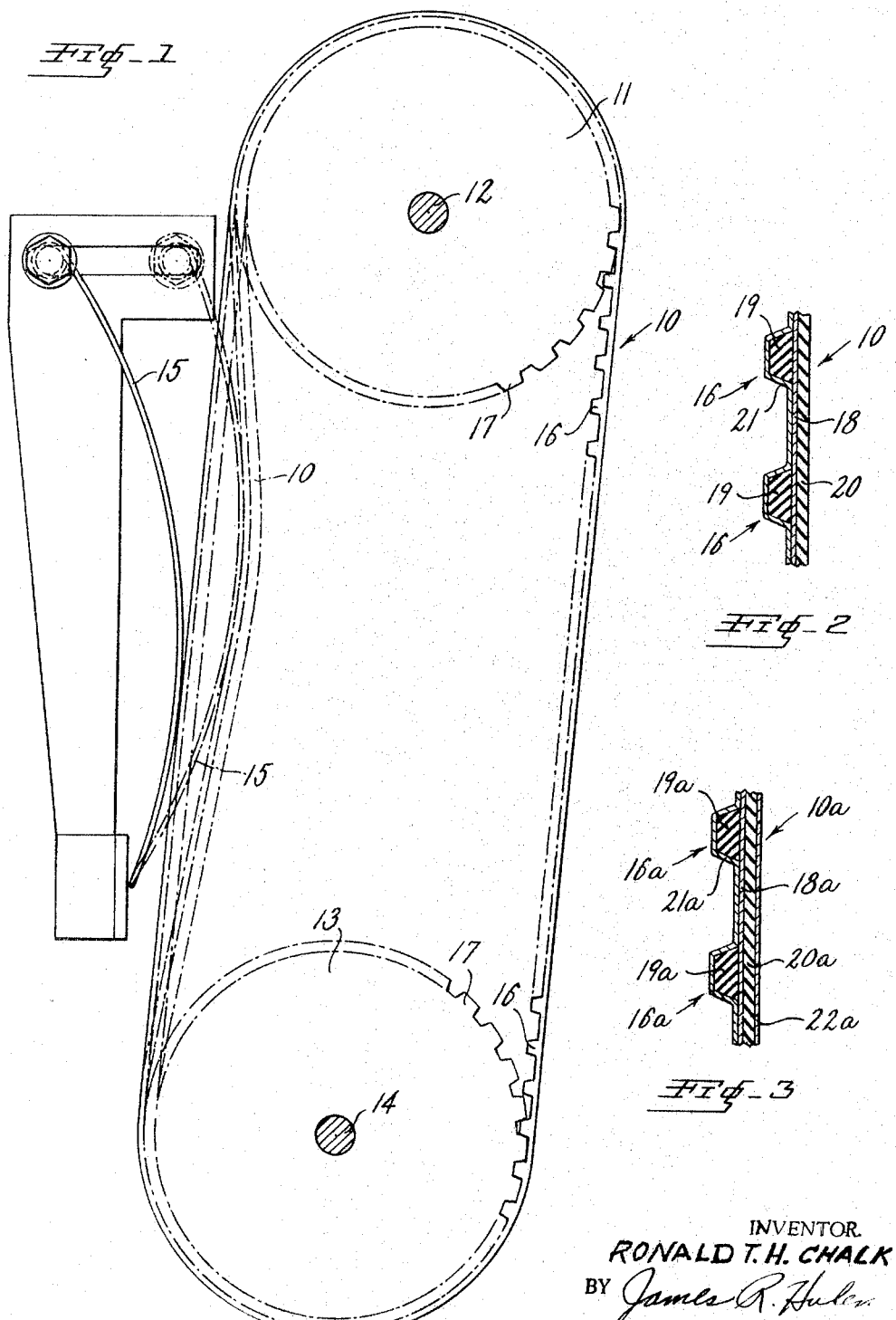

3,334,524
POWER TRANSMISSION BELTS
Ronald T. H. Chalk, London, England, assignor to The North British Rubber Company Limited, Edinburgh, Scotland
Filed Oct. 27, 1964, Ser. No. 406,838
1 Claim. (Cl. 74—232)

This invention relates to a power transmission belt and, more particularly, to an inextensible, internally toothed flexible belt such as that disclosed in United States Patent No. 2,507,852 issued on May 16, 1950, to Case, which transmits the drive from a toothed driving pulley to a toothed driven pulley.

When the driving and driven pulleys are comparatively widely spaced and/or the toothed belt is run at high speeds, the slack side of the belt tends to vibrate or flutter which prevents the correct entry of the belt teeth into the grooves of the driven pulley and this results in excessive belt wear.

Furthermore, in the case of an internal combustion engine having an overhead cam shaft, there are further factors which render it difficult to use a toothed belt drive between the crank shaft and cam shaft.

These factors are:

(a) the plus or minus manufacturing tolerances on the belt length,
(b) the plus or minus tolerances on the diameters of the toothed pulleys,
(c) the plus or minus tolerances on the dimensions between machined surfaces on the engine, also the varying thickness of gaskets fitted between adjacent surfaces, and
(d) the change in the center distance between the toothed pulleys due to the thermal expansion of the cylinder block and/or cylinder head when the engine is started from cold and then run until it attains its normal working temperature.

These difficulties may be overcome by utilizing a belt tensioner having an anti-friction coating of a synthetic resinous or other low friction material on a surface which is adapted to engage the slack side or run of the belt.

Alternatively, and in accordance with the present invention, an anti-friction material is compounded with, or applied to the material forming the backing of the belt, the slack side of which is, during operation, adapted to be engaged by a belt tensioner.

In the accompanying drawings:

FIG. 1 is a side elevational view of a power transmission belt according to the present invention shown mounted on driving and driven pulleys in combination with a belt tensioner.

FIG. 2 is a part-section of the belt shown in FIG. 1.

FIG. 3 is a part-section of another embodiment of the belt shown in FIG. 1.

The power transmission belt shown generally at 10 in FIG. 1 is shown passing around a driving pulley 11 mounted on the end of a shaft 12 and a driven pulley 13 mounted on the end of a shaft 14, with an adjustable tensioner 15 engaging the back of the slack side of the belt 10. The belt 10 is provided with teeth 16 which mesh with teeth 17 formed on the pulleys 11 and 13.

Belt 10 is endless and provided with a strain resisting inextensible member 18 (see FIG. 2) comprising a plurality of turns of a continuous strand which may be of high tensile wire, nylon, rayon, cotton or other suitable material. The strain resisting member 18 is helically wound around the belt in a single layer which lies adjacent the dedendum line of the teeth 16 and carries the working load imposed upon the belt.

The body 19 of the teeth 16 and the backing layer 20 of the belt are made of a compound including an anti-friction material, such as graphite, which reduces friction when the back 20 of the belt is engaged by the tensioner 15. The inner face of the belt is covered by a nylon fabric 21 which defines the outline of the teeth 16 and provides a wear resisting surface. If desired, the body 19 of teeth 16 may be formed from extruded rubber.

The following is a specification of a suitable graphite compound for the backing of the belt:

| | |
|---|---|
| Polychloroprene | 100 |
| Stearic acid | 0.5 |
| Mag. oxide | 7.0 |
| Nonox D (phenyl B—naphthylamine) | 2.0 |
| SRF Black | 58.0 |
| A.C. polyethylene | 8.0 |
| Ancatax (dibenzythiazyl disulphide) | 2.5 |
| Zinc oxide | 4.0 |
| | 182.0 |
| Powdered graphite | 9.1 |

Referring to FIG. 3, an alternative embodiment is shown in which the graphite is excluded from the compound forming the backing 20a of the belt and in this case the backing is coated with an anti-friction, synthetic resinous material 22a such as a polytetrafluoroethylene. This latter construction, provides an anti-friction surface which tensioner 15 may contact to maintain belt 10 in a taut condition.

It will be apparent from the foregoing description that the present invention provides a new and improved means for eliminating vibration from a toothed belt.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

A power transmission belt comprising: an internally toothed surface for transmitting the drive from a toothed driving pulley to a toothed driven pulley; an inextensible strain resisting layer overlying said toothed surface; and a backing layer external of said strain resisting layer, said backing layer being adapted to be engaged by a belt tensioner and having graphite compounded therewith to reduce friction between said backing layer and said tensioner during operation.

References Cited

UNITED STATES PATENTS

| | | | |
|---|---|---|---|
| 2,223,518 | 12/1940 | Heuberger | 308—240 X |
| 2,526,324 | 10/1950 | Bloomfield | 74—237 X |
| 2,669,491 | 2/1954 | Haller | 308—240 X |
| 2,807,511 | 9/1957 | Fleming | 308—238 X |
| 2,815,252 | 12/1957 | Baker | 308—238 X |
| 2,831,359 | 4/1958 | Carle | 74—233 |
| 3,103,703 | 9/1963 | Ludewig. | |
| 3,151,015 | 9/1964 | Griffith. | |
| 3,167,308 | 1/1965 | Bernstein et al. | 308—238 X |
| 3,236,573 | 2/1966 | Donnellan | 308—238 |

FRED C. MATTERN, Jr., *Primary Examiner.*

DAVID J. WILLIAMOWSKY, *Examiner.*

J. A. WONG, *Assistant Examiner.*